July 5, 1966     J. W. HARRISON     3,258,814
APPARATUS FOR MAKING ELASTIC FILM CAPS
Original Filed March 12, 1959     2 Sheets-Sheet 1

INVENTOR
JOHN W. HARRISON

BY John J. Toney

ATTORNEY

July 5, 1966  J. W. HARRISON  3,258,814
APPARATUS FOR MAKING ELASTIC FILM CAPS
Original Filed March 12, 1959  2 Sheets-Sheet 2

INVENTOR
JOHN W. HARRISON

BY *John J. Toney*

ATTORNEY

3,258,814
APPARATUS FOR MAKING ELASTIC FILM CAPS
John W. Harrison, Winchester, Mass., assignor to W. R. Grace & Co., Cambridge, Mass., a corporation of Connecticut
Application Apr. 30, 1962, Serial No. 191,365, now Patent No. 3,175,027, dated Mar. 23, 1965, which is a division of application Serial No. 798,869, Mar. 12, 1959. Divided and this application Apr. 29, 1964, Serial No. 363,579
2 Claims. (Cl. 18—19)

This application is a division of my co-pending patent application, Serial No. 191,365, filed April 30, 1962, and now Patent No. 3,175,027, dated March 23, 1965, which was a division of my co-pending application, Serial No. 798,869, filed March 12, 1959 and now abandoned.

Elastic margin film caps have found wide use as dust covers for laboratory glassware, covers for refrigerator dishes and jars, bathing caps, and many other uses. They are commonly made by stitching on stretched marginal band of elastic rubber around the periphery of a disc of film. When the rubber relaxes, it gathers or shirrs the margin and pulls the disc into a cap shape. Commonly, the method used to hold the elastic band is to enclose it within a folded marginal fabric tape.

I have discovered a far cheaper way of producing these useful items. Accordingly, it is an object of this invention to produce such caps in a completely automatic manner; to avoid the necessity for elastic bands or tape; to make an entirely unitary cap, to give elastic properties to the margin of the cap; and to supply film covers for dish or tray-packed foodstuffs which may be placed on the container by the packer, but removed by the housewife and reused as a cover for the particular container so long as any foodstuff remains.

My invention is based on my discovery that if a film having high shrink energy is restrained and heat is applied to the margin or along a narrow line adjacent to the margin, and if, after heating, the restraint on the film is immediately released, the effect on the film is similar to that of sewing an elastic thread under tension onto a fabric or film. The line along which the heat was applied thickens materially as the material is drawn into the shrunk area, becoming, in many instances, as much as 10 times as thick as the remaining areas in the film. It is a special feature of this invention that the heated line, which is in this instance adjacent to the periphery of the cap, becomes what is an essentially permanent, rubber-like elastic area capable of stretching and retracting repeatedly. The relaxed perimeter of this heated zone is much less than the original dimension. Consequently, the unheated panel area inside the heated peripheral zone is puckered into a cap shape. This change, in what was essentially a film having a very limited "elastic" property, is a necessary property. Commercially available, oriented, heat shrinkable materials exhibit this effect to some degree, for example, oriented saran, rubber hydrochloride, and (poly) ethylene terephthalate film will pucker and form a cap shape of limited elasticity. But very high shrink energy appears to be necessary to form the effective caps of this invention. The chemical structure of the film appears to be unimportant. The necessary physical properties, however, of any film which is suitable for the purposes of this invention appear to be the following:

(a) The film material should have been stretched so that when heated up to 96° C. it will shrink at least 20 percent in each direction.

(b) Its shrink energy, i.e., the pull exerted during shrinkage, should approximate 100 pounds or more per square inch of cross section.

(c) The heated area on cooling should remain in a permanently "elastic"[1] condition.

I have found that polyethylene film which has been irradiated to a dosage of between 2 to 200 megarads and after irradiation has been stretched biaxially to a material degree possesses this property.

In the case of properly chosen films, the heated area becomes permanently elastic. After stretching, it may take a small degree of permanent set (about 10 percent) but thereafter it stabilizes and will withstand repeated stretching without undergoing any substantial change in dimension.

Figure 1:
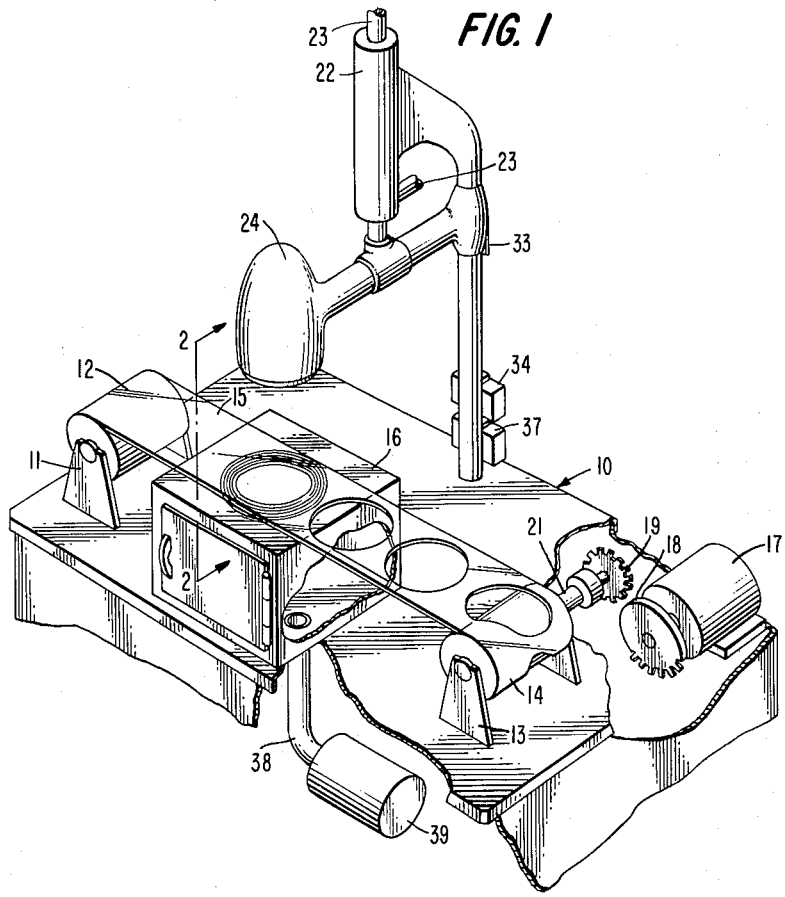
FIGURE 1 illustrates in perspective a machine for manufacturing such caps automatically.

Referring to FIGURE 1, the machine comprises a base 10 on which is mounted a support 11 for the supply roll 12. A companion support 13 for the waste take-up roll 14 is mounted on the opposite end. Film 15 which unwinds from supply roll 12 is carried across the top of a small vacuum chest 16. Drive for the machine is secured by motor 17 through intermittent gearing diagrammatically indicated by the gears 18 and 19. When the teeth of these gears intermesh, film 15 is advanced to the next indexing position.

Whenever the shaft 21 of the waste take-up roll comes to rest, a small microswitch (not shown) energizes a double-acting electro pneumatic valve (not shown) which admits air to the air cylinder 22 through the conduits 23, and exhausts air beneath the piston through conduit 23a. Pressure head 24 is thus forced into contact with the film.

Figure 2:
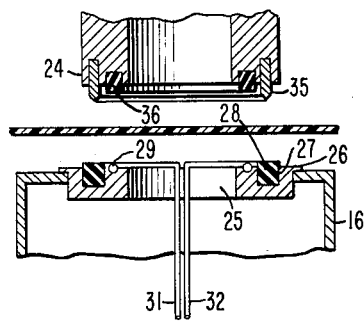
FIGURE 2 is a cross section of a portion of the machine on the line 2—2 of FIGURE 1.

Referring to FIGURE 2, it will be seen that the vacuum chest 16 carries a large orifice 25 which faces upwardly. A portion of this orifice is occupied by a ring 26 of heat-resistant material such as asbestos-cement insulating board. Ring 26 carries a channel 27 in which is placed a knife-bedding ring 28 of some relatively soft substance preferably heat-resistant rubber. Immediately inside the ring 28, a ring 29 of resistance wire is fastened to the heat-resistant asbestos-cement ring 26. When the head 24 is lowered by the piston, bracket 33 comes into contact with microswitch 34 and energizes the resistance wire ring 29 through the electrical conductors 31 and 32. Meanwhile, the knife 35 which is fitted into the end of the head 24 has severed a disc from the film 15 and film 15 is also pushed into firm contact with the resistance wire by means of a ring 36 of compressible heat-resistant rubber. Restraint at the moment of heating is thus secured. A controlled amount of heat only should act on each disc of film material. Consequently, resistance wire 29 after its original energization is almost immediately timed out by the action of a timing device 37. Time-out varies according to the thickness and nature of the film, but as an example, if the film be 1 mil thick irradiated polyethylene and the diameter of the ring of resistance wire be approximately 3¼ inches, time-out should occur after approximately 120 watt seconds have been released by the resistance wire.

---
[1] "Elastic" is used in its popular sense as possessing the properties of extensibility and retractibility associated with vulcanized rubber.

As soon as gear 19 begins its movement again, air pressure in cylinder 22 is reversed and heat 24 rises. Quite a small fan 37 or some other vacuum-producing device is connected to the chamber 16 through the conduit 38 to create a small pressure differential between the atmosphere and that within the chamber. As the head 24 rises and releases the film, this pressure differential pushes the newly formed cap into the vacuum chamber. Successive caps collect in it and may be removed periodically.

Figure 3:
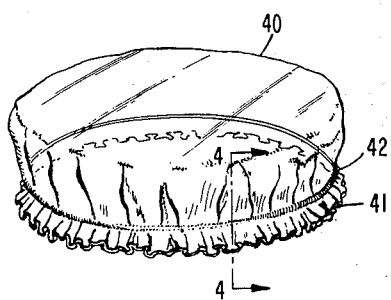
FIGURE 3 illustrates a jar cover made on the machine of FIGURE 1.
Figure 4:
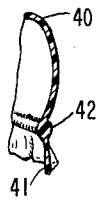
FIGURE 4 is an enlarged cross section of the cover taken on the line 4—4 of FIGURE 3.

The caps which are formed are shown in FIGURE 3. It will be noticed that the cap 40 is characterized by a shirred margin 41 and by a much thicker ring 42 of the same material as the cap. As has been stated, ring 42 is permanently elastic and behaves like an elastic band. The cap can, consequently, be snapped over a bowl or a jar mouth and is effective to prevent desiccation in refrigerators or prevent foreign material from falling into an opened jar.

Figure 5:
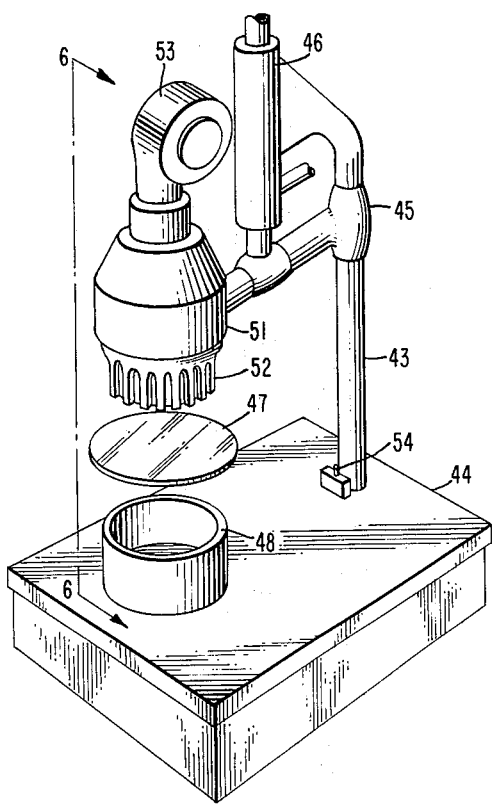
FIGURE 5 illustrates in perspective a machine which is used when it is desired to have the entire margin of the cap elastic.
Figure 6:
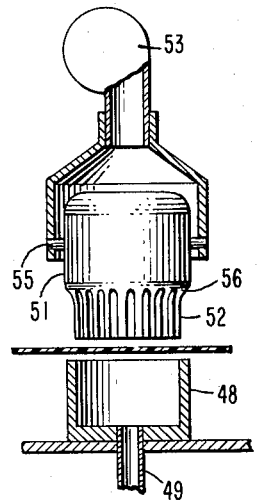
FIGURE 6 is a cross section of the machine taken on the line 6—6 of FIGURE 5.

Sometimes, as in the case of throw-away bathing caps, it is desirable to have the elastic portion of the cap wider and stronger than that shown in the cap of FIGURE 3. For making bathing caps and the like, an apparatus is shown in FIGURE 5. Support arm 43 rises from work table 44 and holds and guides a reciprocating arm 45. Supply and release of air in cylinder 46 which controls the reciprocation of arm 45 is by means of a foot valve (not shown). The operator places a disc of film 47 over the cup 48 which may be of any convenient size. Cup 48 is connected through conduit 49 to a source of reduced atmospheric pressure. The operator then lowers the head 51. As the fluted portion of the head 51, which forms the die punch 52, moves into the cup, it gathers the film about itself in deep regular folds. At the same time, the reduced pressure inside the cup 48 aids in the proper distribution of the film. Flared portion 56 restrains the film by pinching it against the inner margin of the cup. Hot air blower 53 is energized when bracket 45 strikes microswitch 54 and projects hot air through the circumferential passageway 55. Consequently all of the projecting margin, which is exposed beyond the flutes, is subjected to heating. The air temperature should be appropriate to the film used. As an example, the time of heating of a 1 mil film of irradiated polyethylene when the air reaching the film is between 300–400° F. is about one second. It shrinks and turns into a wide, strong elastic band. If desired, instead of removing caps individually, cup 48 may be a cylinder mounted on a receiving chest similar to that shown in FIGURE 1. Then the differential pressure pops the cap into the chest as soon as head 51 rises and removes the restraint on the film.

Although designed as a throw-away item, bathing caps made by this procedure are very strong, tough and elastic enough to keep the hair from getting wet. They may be used for a considerable time before being discarded.

I claim:

1. A film cap machine having one fixed and one reciprocating circular die element, film securing means adjacent the margins of each element to restrain a sheet of film pressed between said elements, means to heat an area of film adjacent the margin, the said elements being adapted to shield central areas of the film from the heat applied to the peripheral zone of the film.

2. A film cap machine having a reciprocating head, said head carrying the punch of a die set, a base, a die cup fastened to the base in cooperative relation to the punch, the upper end of the punch flaring outwardly to join the head, said flare extending beyond the inner confines of the cup whereby a sheet of film pushed into the cup by the punch will be restrained and pinched at the inner margin of the cup, and means to supply a stream of hot gas only around the periphery of the punch whenever the head is in lowered position.

References Cited by the Examiner
UNITED STATES PATENTS

| | | | |
|---|---|---|---|
| 2,521,387 | 9/1950 | Maynard et al. | 18—19 |
| 2,547,331 | 3/1951 | Lent | 18—19 |
| 2,590,379 | 3/1952 | Cloud | 18—19 |
| 2,615,201 | 10/1952 | Cloud | 18—19 |
| 2,690,593 | 10/1954 | Abercrombie | 18—19 |
| 3,072,964 | 1/1963 | Tilden | 18—19 |
| 3,105,270 | 10/1963 | Fibish | 18—18 |

WILLIAM J. STEPHENSON, *Primary Examiner.*